United States Patent
Jones et al.

(10) Patent No.: US 6,195,422 B1
(45) Date of Patent: Feb. 27, 2001

(54) METHOD FOR PROVIDING EQUAL ACCESS DIALING FOR PRE-PAID TELECOMMUNICATION SERVICES

(75) Inventors: Douglas R. Jones, Medford, NJ (US); Robert D. Farris, Sterling, VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

(21) Appl. No.: 09/193,246

(22) Filed: Nov. 17, 1998

(51) Int. Cl.$^7$ .................................................. H04M 17/00
(52) U.S. Cl. ........................ 379/144; 379/115; 379/120; 379/127; 379/220
(58) Field of Search ................... 379/111, 112, 379/114, 115, 120, 121, 124, 127, 143, 144, 219, 220

(56) References Cited

U.S. PATENT DOCUMENTS

| | | | |
|---|---|---|---|
| 4,706,275 | 11/1987 | Kamil | 379/144 |
| 5,008,929 | 4/1991 | Olsen et al. | 379/112 |
| 5,359,642 | * 10/1994 | Castro | 379/121 |
| 5,511,114 | 4/1996 | Stimson et al. | 379/114 |
| 5,539,817 | * 7/1996 | Wilkes | 379/230 |
| 5,557,664 | * 9/1996 | Burns et al. | 379/114 |
| 5,590,133 | 12/1996 | Billström et al. | 370/349 |
| 5,621,787 | * 4/1997 | McKoy et al. | 379/144 |
| 5,661,790 | 8/1997 | Hsu | 379/209 |
| 5,751,961 | 5/1998 | Smyk | 395/200.47 |
| 5,781,620 | * 7/1998 | Montgomery et al. | 379/115 |
| 5,793,762 | 8/1998 | Penners et al. | 370/389 |
| 5,828,740 | * 10/1998 | Khuc et al. | 379/144 |
| 5,838,682 | 11/1998 | Dekelbaum et al. | 370/401 |
| 5,850,433 | 12/1998 | Rondeau | 379/201 |
| 5,854,975 | * 12/1998 | Fougnies et al. | 379/112 |
| 5,883,891 | 3/1999 | Williams et al. | 370/356 |
| 5,889,774 | 3/1999 | Mirashrafi et al. | 370/352 |
| 5,923,659 | 7/1999 | Curry et al. | 370/401 |
| 5,940,598 | 8/1999 | Strauss et al. | 395/200.79 |

\* cited by examiner

Primary Examiner—Curtis A. Kuntz
Assistant Examiner—Binh K. Tieu
(74) Attorney, Agent, or Firm—McDermott, Will & Emery

(57) ABSTRACT

To provide toll services but limit the amount of such services, toll calls from a party's line are routed to selected calling card type processing equipment. However, so that such calling party's have equal access to multiple carriers and need not dial additional digits, the communications network supplies calling and dialed number information to the processing equipment. The network preferably identifies the call as requiring a special application (without user input of billing number or PIN information). The processing equipment performs all necessary account related screening, e.g. to determine the remaining amount of funds available for the caller's toll services, to route the call and to continuously rate the call cost for the duration of the call. If there are no remaining funds, the call is disallowed. If the funds run-out during the call, the calling card type processing equipment interrupts the call and informs the caller. The invention may be implemented using switch-based PIC functionality to route the calls to the selected service provider's equipment. The preferred embodiment, however, utilizes intelligent network processing, to select one provider's equipment, route the call to that provider's equipment, and supply the necessary information to the equipment, in order to facilitate the account processing without further input from the caller. The caller need only dial a 1+ the 10-digit number to place a toll call, in the normal manner.

15 Claims, 4 Drawing Sheets

METHOD FOR PROVIDING EQUAL ACCESS DIALING FOR PRE-PAID TELECOMMUNICATION SERVICES

TECHNICAL FIELD

The present invention relates to providing toll services from a subscriber line subject to pre-established limits in amount, and more particularly to a means and methodology for using selected calling card type processing equipment in providing such services, without user input of identification information, while providing equal access to inter-exchange carriers.

Acronyms

The written description uses a large number of acronyms to refer to various services, messages and system components. Although generally known, use of several of these acronyms is not strictly standardized in the art. For purposes of this discussion, acronyms therefore will be defined as follows:
AIN—Advanced Intelligent Network
AMA—Automatic Number Ientification
ANI—Automatic Message Accounting
CCN—Cash Card Network
CCS—Calling Card System
CPR—Call Processing Record
CLEC—Competitor Local Exchange Carrier
EO—End Office
GAP—Generic Address Parameter
IAM—Initial Address Message
ISDN—Integrated Services Digital Network
ISUP—ISDN User Part (of SS7)
ISCP—Integrated Service Control Point
IXC—Interexchange Carrier
LATA—Local Access and Transfer Area
LEC—Local Exchange Carrier
OHD—Off Hook Delay
PIC—Preferred Interexchange Carrier
PIN—Personal Identification Number
POP—Point of Presence
PSTN—Public Switched Telephone Network
SCP—Service Control Point
SS7—Signaling System Seven
SSP—Service Switching Point
STP—Service Transfer Point
TCAP—Transactional Capabilities Application Part

BACKGROUND

Prepaid cash card calling is presently being made available by certain companies (AT&T, Sprint, and others) over their own networks. Generally these services involve allowing access to the provider's network by having the end-user dial an 800 number. A database with account management and real-time-rating capabilities (RATER) tracks the prepaid cash card value and deducts the account as call progression occurs.

The customer acquires a card with a special code, a credit amount and the telephone number of a special central office or like facility, by either a cash or credit card payment. The code, the credit amount and telephone numbers may be acquired, for example, through the regular credit card companies and charged to the acquirer's credit card.

Alternatively, the credit or cash amount, the telephone numbers and identifying code can be purchased at sales points such as in airports, hotels, rent-a-car stations and the like. The amount paid is credited to the acquirer for use against future telephone calls. The credited amount is stored in a memory at the special central office or the like, such as a data base or platform, along with the special code.

A party wishing to make a telephone call, which may be a local call or a toll call, can acquire a prepaid credit amount. He or she uses the nearest available telephone, removes the handset, and dials a special data base, platform or special central office or exchange. When he or she is connected to the data base, platform, special central office or exchange, a special dial tone is sent from the special exchange to the calling station. When the calling party hears the special dial tone, indicating that the computer at the exchange is ready for the user, he or she dials the identifying code and the desired called number. The computer at the special exchange checks the code and registers the desired called number.

If the code number is a genuine code with credit, a regular dial tone is sent to the calling party station as he or she is connected to the regular telephone system. The computer at the special exchange routes the call on the most economical available lines according to prior arrangements with long distance line suppliers. The calling party's predialed numbers are transmitted. The system can also be arranged so that the calling party dials the called party responsive to receipt of the regular dial tone.

Special exchange equipment, such as an intelligent platform, can provide an artificial or prerecorded voice announcement stating the amount of credit available and that the amount of credit is equivalent to a stated number of minutes of talking time on the call being connected. The announcement is made according to the charge rate for the distance between the calling and called parties.

A credit check can be accomplished contemporaneously with the number code verification. If the code is invalid an announcement is made advising the customer to try again. The customer is allowed a predetermined plurality of tries (for example three) before being disconnected from the special central office. If he or she is trying again for the second and third times he or she is reconnected to receive the special dial tone. After the third time he or she is released from the special exchange after receiving a recorded announcement explaining that the code is not valid.

Conventional systems can operate to allow the calling party to dial while the verification is being accomplished, in which case when the calling party hears normal dial tone. A register in the exchange can then input the dialed information to cause the exchange to complete the call between the calling party and the called party.

A normal time and distance computing circuit, such as a peg counter, can be put into service to provide information for timing the call against the available credit. Thus, for example, the information from the peg counter is sent to a comparator to continuously determine whether the calling party's credit is sufficient to pay for the call. When the credit equals the used time×rate, the call is automatically ended by the computer.

Upon failure to maintain a positive credit level, the connection between the calling and called party opens, the connection to the computer however remains, and an announcement is made to notify the customer to insert another code number, if available. If a new code number (with valid credit) is inserted by the customer, then the calling party again receives a dial tone and can dial a new called party. In other words, he or she goes back to the input where he or she has computer tone and is told to dial the code number and the calling party number. All the steps are repeated and the new call is connected. If the customer does not have a new code number, then the connection between the computer and the calling party is broken.

The call can also be terminated by the user. When the call is terminated by the user, and he or she still has credit, he or she is again connected to normal dial tone, and he or she merely has to dial another call, if so desired. If he or she does not want to dial another call, then he or she returns the handset to the hookswitch. If he or she does want to make another call, he or she dials the number after hearing a normal dial tone. Thus, the customer does not have to repeat the entire connection back to the computer and have the validation procedure repeated. He or she had already been checked and validated and therefore is connected to a normal dial tone. The process is repeated as long as positive credit remains.

With a dedicated public telephone, the customer calling party must have a prepaid code number. To begin the operation, he or she goes off hook with the dedicated public telephone. The calling station receives computer dial tones as soon as going off hook. He or she then dials in the secret code number and the system checks to see if he or she has a valid number. If he or she does, he or she is visually or audibly notified of the amount of credit available in his code. If he or she does not have a valid code then he or she is notified that he or she has inserted an invalid code. A recorded message can be sent for this purpose.

If an invalid code is inputted more than a predetermined number of times (three times for example), then the phone is disconnected for a specified time period (for example, five minutes). This disconnection time is implemented to discourage practical jokes, fraud or anyone maliciously trying to tie up the telephone. After the five minute time period, the phone is returned to its normal operating capabilities. A recorded message may be sent to notify potential users that this phone is out of order for diminishing periods of time, i.e., three minutes, four minutes, etc.

After verification of the code number and credit, the calling party is connected to the regular telephone system and receives a regular dial tone. The calling party goes through the normal call process. Responsive to dialing, the user is given a call duration announcement indicating the length of call time that the credit amount will allow. The time charge rate of the call is continuously computed and subtracted from the credit amount. The call can be terminated either due to lack of credit or by the user. If the user terminates by dialing special code or by closing the hook switch when there is still more credit left, the user is then provided with a regular dial tone. If there is no credit left then the calling party phone is connected to the computer and receives the computer dial tone. If he or she does not dial in his or her code number after a predetermined time period, he or she is disconnected. Using an announcement, he or she can be notified to input a code or be disconnected. It should be understood that both announcements and visual indications may be used.

When the code number and credit of a user are verified, the calling party is then connected through a register to a redialer. The register stores the called number which was received from the calling party and directs the redialer to dial the number after verification. The dialed number or dial tones are then directed through a router to the regular telephone system. The router selects the best possible route cost-wise for the particular call if it is a toll call.

The common assignee's U.S. Pat. No. 5,621,787 to McKoy, et al., issued Apr. 15, 1997, for "Prepaid Cash Card," describes an improvement on the foregoing systems. The McKoy et al. Patent describes a prepaid cash card used to purchase services via telephone. That patent is incorporated by reference herein in its entirety. The system provides for selection of multiple interexchange carriers and a variety of techniques for authenticating the user of the prepaid cash card to purchase services via telephone.

Like the older conventional art previously described, the system described in the McKoy et al. Patent is based upon a prepaid cash card that provides an alternative to using coins or other forms of payment for toll calls. The purchaser (end user) of the prepaid cash card has the option of selecting his or her own Interexchange Carrier (IXC) if long distance calls are purchased with the card described in the McKoy et al. Patent.

After purchase of a prepaid cash card, which has a set dollar value determined at the time of the purchase, the end-user can access services over the Cash Card Network (CCN), such as that described with respect to the conventional art. When an end-user uses the prepaid cash card to place calls, the intelligence to permit call completion will exist within a separate platform (such as that described in the patent), rather than in the calling station. The account management and call rating for the call is provided through a separate authorization network, which is stated to be capable of integration into an Advanced Intelligent Network (AIN) technology in the ultimate version. However, the version described does not rely on AIN, but rather a dedicated network as depicted in the drawings of the patent.

While the above described systems provide a greater or lesser fulfillment of their intended functions they do not respond to a number of demands that are outstanding at the present time. As an example of these needs may be cited the satisfaction of the requirements of so called Universal Service.

The concept of universal service is old in the telecommunications industry and is applicable to both interexchange (long distance) carriers and local exchange carriers. The regulatorily mandated goal is to provide basic telephone service on a universal basis, including to people of lesser means and people with a poor record of timely payment for services. Typically, these people received local calling services but could not make long distance calls. The regulatory agencies are pushing to extend Universal Service to include a limited amount of long distance services. For the long distance calls, because of the time-based toll charges, there is a need to control usage to some set limit.

It would be possible to give these people pre-paid calling cards in fixed denominations. However, one of the other outstanding requirements of interest to the regulators is to have these customers not be required to utilize long access arrangements in order to utilize the long distance service made available to them. In addition to these needs is also the requirement of providing equal access as defined by the various regulatory agencies, e.g. to the long distance carrier of choice. As outlined above, use of pre-paid calling cards services required long complex input sequence. Also, the choice of card in practice, often serves to pick a particular long distance carrier. These shortcomings are addressed by the method and system of the present invention.

DISCLOSURE OF THE INVENTION

Objects

It is one object of the present invention to provide an improved method and system for responding to the outstanding needs outlined above.

It is another object of the invention to provide such an improved method and system using presently available facilities.

It is a further object of the invention to provide an improved method for providing equal access dialing for prepaid telecommunication services.

It is yet another object of the invention to provide an improved method for providing equal access dialing for prepaid telecommunication services using an existing Advanced Intelligence Network (AIN) in conjunction with an existing prepaid Calling Card System (CCS).

It is another object of the invention to use existing AIN capabilities in the originating office to allow prepaid calling systems to be able to handle toll restricted calls from the end user, wherein the end user need only dial the long distance call and the telephone system provides all of the needed information to the prepaid calling system, so that it does not have to inquire back to the customer regarding the called number, the PIN, and additional authorization.

SUMMARY

These and other objects of the present invention are accomplished using a new method of purchasing telephony service via telephone connection implemented using existing telephone facilities. Pursuant to the new method, end users, rather than accumulate toll charges throughout a month, purchase credits for the amount of time or money they desire. Direct dialed calls may be routed to the telecommunications provider's prepaid calling card system (CCS). The calling card system may be owned or controlled by the telecommunications provider or any other party. It may be owned by the IXC or long distance provider or may be owned by the Local Exchange Carrier or LEC. On the other hand the owner/operator of the prepaid Calling Card System may constitute an independent entity.

Switch-based 'PIC' functionality, in the central offices of the telephone network, could route the universal service toll calls to the CCS of the caller's service provider. The preferred embodiments, however, utilize intelligent call processing of the Advanced Intelligent Network (AIN).

AIN in the telephone network facilitates the routing to the calling card system and provides the original called number to that system along with the end user's account or charge or ANI (Automatic Number Identification) number. This enables end users to directly dial toll calls and have them routed to their Interexchange Carrier's prepaid calling card system, which will debit their account as the time/money is used. There is no requirement for the end user to call an access number and then enter the called number, debit card number, and/or PIN in the local exchange carrier network. According to a preferred method of the invention, AIN facilitates routing to the prepaid calling card system, and the supplying of the information necessary for the prepaid system to verify the end user and determine the original called number automatically.

End users may be allocated a specified amount of usage, as determined by a Universal Service mandate and/or by the carrier who would otherwise look to the end user for collection. As the end users make toll calls, an active database keeps-track of the time and charges on each call based on the called location (where distance sensitive rates apply), and will terminate a call or deny future call attempts when the limit has been reached. It has been discovered that the newly described functions of the database and associated system may be implemented by many existing third party operating company networks and existing prepaid calling card applications or services. This may be accomplished by operating pursuant to the new methodology of the invention.

According to one preferred embodiment of the invention, an Off Hook Delay (OHD) trigger may be established or 'set' for the Universal Service line, or any other subscriber line which is to receive the new service. The Off Hook Delay trigger results in a query to the Service Control Point (SCP) or Integrated Service Control Point (ISCP). The SCP determines whether the call is local or an Interexchange call. If the call is local, the service control point instructs the Service Switching Point (SSP) functionality of the end office (EO) to route the call as normal. If the call is an inter-LATA call, the signal control point (SCP) routes the call to a prepaid calling card system of the type discussed. The prepaid calling card system (CCS) may be one selected at the end user's choice, i.e., the end user would pre-subscribe or be subscribed to a particular restricted call handling Interexchange provider. This choice would allow equal access for IXC and CCS pre-subscription.

In setting up this call, AIN has the capability to force additional information about the call to the prepaid calling card application in the Initial Address Message (IAM). For example, if the end user dialed an inter-LATA number, the original dialed number could also be provided to the end user's IXC's prepaid calling card system, when AIN routes the call to that system. By sending the original dialed number and the customer's charge number, the prepaid calling card system would not need to interact with the caller to obtain calling number information, card number, or PIN.

While the service has been specifically described in the tenor of call restriction imposed by a carrier, it is to be understood that the restriction may be specified by the user customer. Thus, the end user may be provided with a service which gives him or her control over the outgoing calls placed from their line. They may determine when and where to restrict calls.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitation. In the figures, like reference numerals and letters refer to the same or similar elements.

BEST MODE FOR CARRYING OUT THE INVENTION

The conventional prepaid calling card system normally operates by having customers call into an access code that directs the call to the prepaid calling card Interactive Voice Response (IVR) system. The caller is then prompted to enter the number they desire to call along with their calling card number and PIN. The method of the present invention eliminates the need for this identification procedure and provides automatic identification. The diagrams shown in FIGS. 1 and 2 provide high level depictions of the new service.

Figure 1:
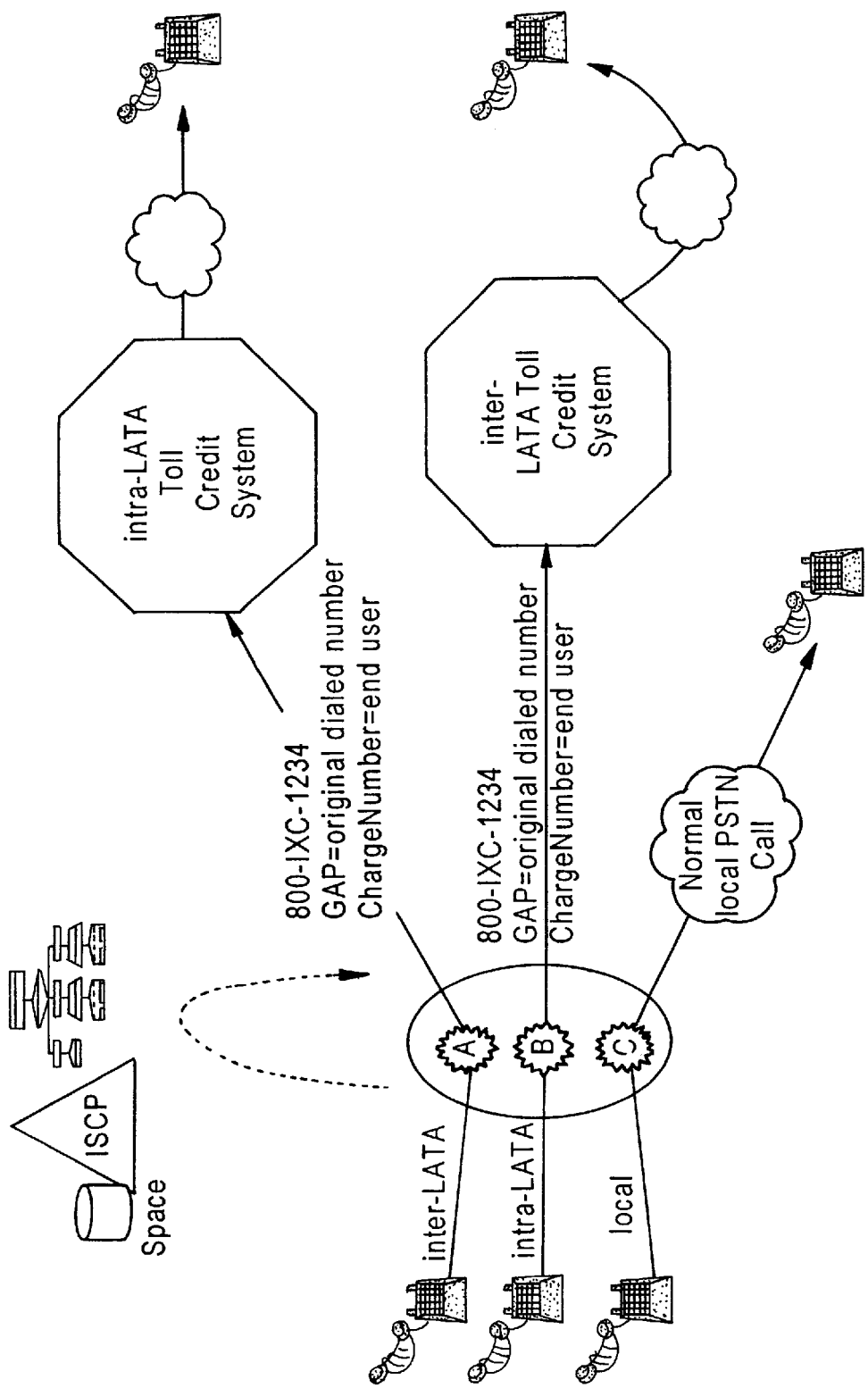
FIG. 1 is a cloud diagram providing a high level depiction of the system and method of the invention according to one preferred embodiment.
Figure 2:
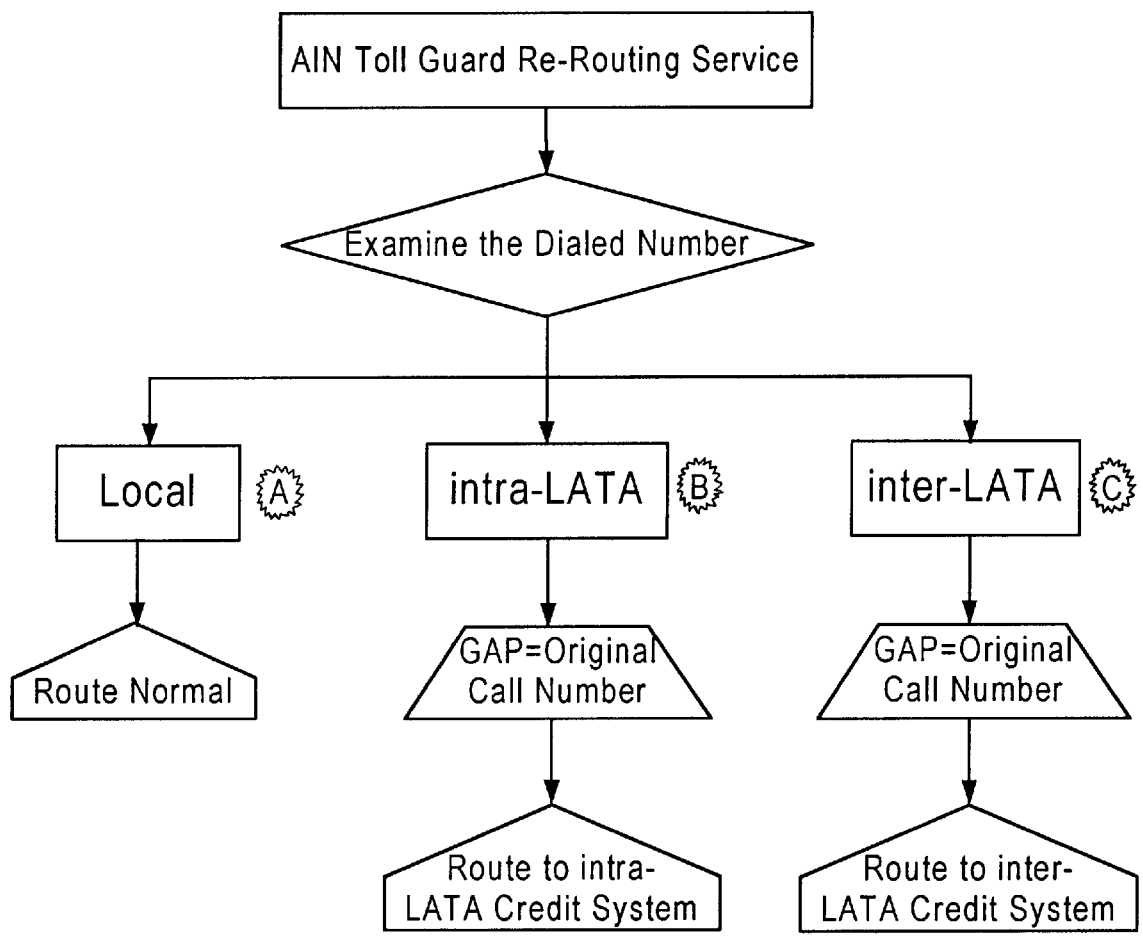
FIG. 2 is a flow diagram providing a high level depiction of the method of the invention according to one preferred embodiment.

Referring to FIG. 1, A, B, and C respectively represent inter-LATA, intra-LATA, and local calls. Each of the inter-LATA and intra-LATA calls A and B are directed to a customer selected toll restricting prepaid calling card system (CCS), such as the systems shown as intra and inter-LATA toll credit systems in FIGS. 1 and 2. Routing for inter-LATA and intra-LATA calls beyond this point occurs under direction and control of the pre-existing calling card system. That system uses the Interexchange carrier network and the intra-LATA Local Exchange Carrier (LEC) short distance network to direct the calls to the respective called parties.

The local call C is not directed to the calling card system but rather is defaulted to the usual local PSTN (Public Switched Telephone Network). Here it is handled in the normal manner of a local call. FIG. 2 provides a different high level depiction of the same operation. AIN Toll Guard Re-Routing Service represents a service which provides a capability to limit the amount of telephone usage incurred on a particular end user's account (specifically, usage based toll charges). The remainder of FIG. 2 depicts the local, C, intra-LATA, B, and inter-LATA, A, call flows, just described and as presently to be described in further detail.

Figure 3:
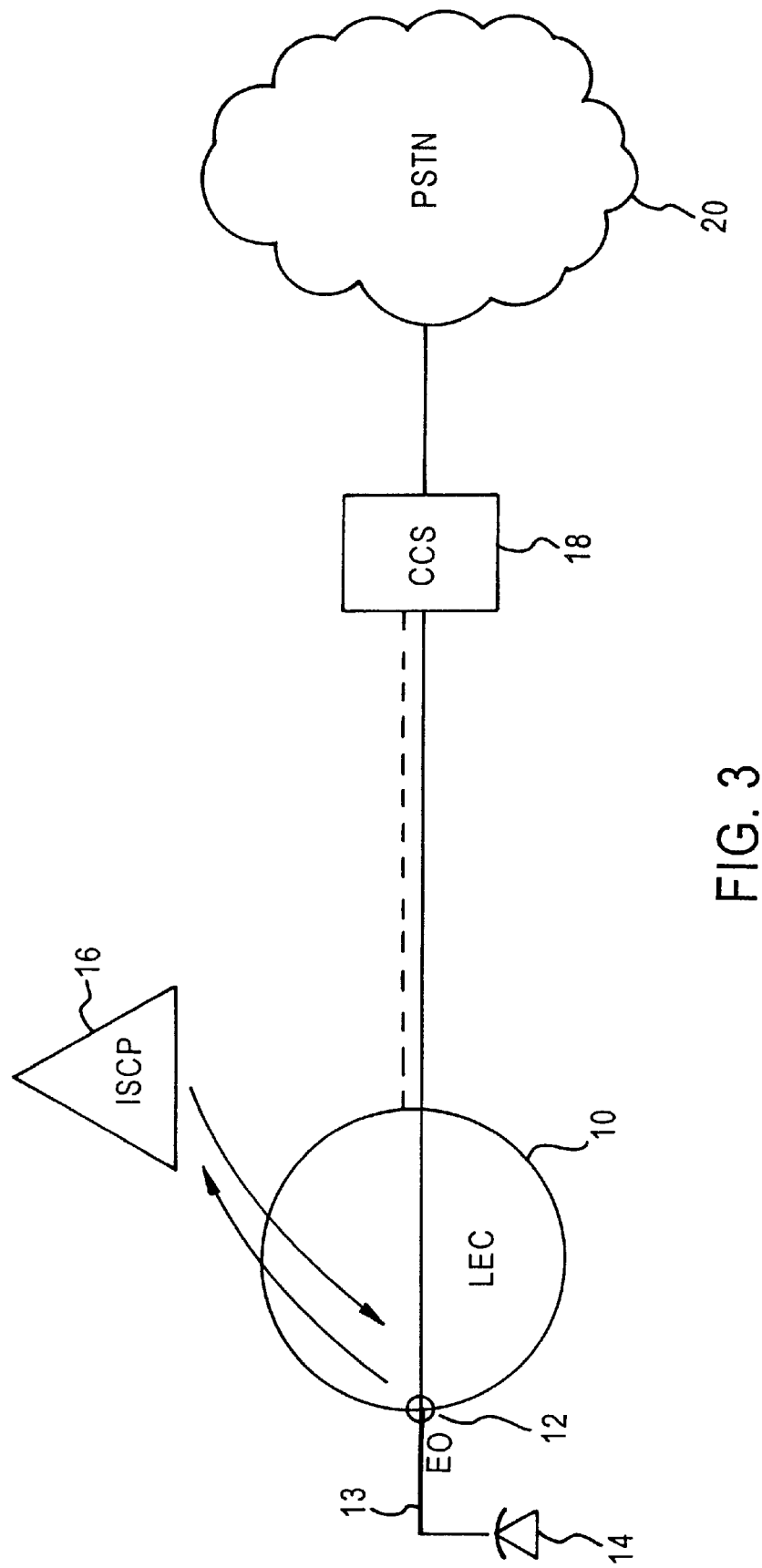
FIG. 3 is a further high level diagrammatic depiction of the system and method of the invention according to one preferred embodiment.

Referring to FIG. 3, a Local Exchange Carrier (LEC) network is represented at 10. An End Office (EO) 12 in that network is connected by a local link or loop 13 to a representative subscriber terminal 14. It is assumed that the subscriber is subject to restriction to a pre-determined limit on long distance toll charges. As an example, a limit of ten dollars per month may be imposed.

The Local Exchange Carrier (LEC) has Advanced Intelligent Network (AIN) capability, and the LEC's network 10 includes or connects to an Integrated Service Control Point (ISCP). The SCP, one element of the integrated ISCP system, is a service control point (SCP) database provided with the call sorting functionality described. The ISCP 16 connects through conventional data links and a Signal Transfer Point (STP, not shown) to the End Office (EO) 12. The End Office 12 is also connectable to a prepaid Calling Card System (CCS) 18 via voice and signaling links. The prepaid Calling Card System is in turn connected to a Public Switched Telecommunication Network (PSTN) 20, which may constitute an Interexchange Carrier network such as that of AT&T or MCI. While only one prepaid Calling Card System is shown, multiple such systems may exist as shown in FIGS. 1 and 2. Those Figures show both inter-LATA and intra-LATA prepaid Calling Card Systems.

The processing for the restricted toll call service of the present invention involves two routines or applications. One application takes the form of profile data and/or service logic in the LEC network 10. As discussed more later, this logic may reside in the end office switch 12, but preferably the controlling portion of this logic runs in a network control node, such as a service control point within the ISCP 16. The other application for the service runs in a selected calling card system.

The calling card system may run several applications, such as the restricted toll service application, a pre-apid calling card service application, and a credit card calling service application. Of particular note, the application in the LEC network 10 supplies certain necessary information to the calling card system 18, to enable the restricted toll service application in the system 18 to process the call as a pre-paid type call without the requirement for caller input of any special data.

In addition to prepaid Calling Card Systems for handling different types of calls, such as inter-LATA and intra-LATA, there may be a choice between competitive systems in either category. As previously pointed out, the calling card system may be owned or controlled by the telecommunications provider or any other party. Frequently it will be owned by the IXC or long distance provider such as AT&T or MCI, by way of example. On the other hand the prepaid Calling Card System operator may constitute an independent entity. The Calling Card System shown in FIG. 3 is an inter-LATA Calling Card System and most likely owned by an Interexchange Carrier (IXC). The Calling Card System appears as simply another switch to the originating switch in the End Office 12.

The subscriber to the toll restricted line 13 to terminal 14, or any subscriber, is free to choose his or her calling card system. By way of example, that calling card system may be the AT&T or the MCI calling card system. The identity of that calling card system is built into the AIN database record associated with that line in the same manner as long distance PICs (Preferred Interexchange Carriers) are identified with the line for regular long distance toll services.

In a network such as shown in FIG. 3, routing typically is based on dialed digit information, profile information regarding the link or station used by the calling party and profile information regarding a line or station in some way associated with the dialed digits. The end office switch serving the respective line stores at least some of the profile information. For services supported by the AIN functionality of the network, the SCP or ISCP stores additional service logic associated with one or both of the parties to a call.

On a normal call, an end office type switch will detect an off-hook condition on the line and provide dial tone. The switch identifies the line and retrieves profile information corresponding to the off-hook line. For example, the profile identifies the currently assigned telephone number. The profile also identifies any relevant trigger conditions. Assuming no trigger for AIN processing, the switch in the end office receives dialed digits and routes the call. The switch may route the call to another line serviced by that switch, or the switch may route the call over trunks and possibly through one or more tandem offices to an end office that serves the called party's station or line. The switch terminating a call to a destination will also utilize profile information relating to the destination, for example to forward the call if appropriate, to apply distinctive ringing, to trigger AIN processing for a service for the called subscriber, etc.

AIN call processing involves a query and response procedure between an SSP capable switching office and a database system, such as the SCP database in the ISCP 16. The SSP capable switching offices initiate such processing upon detection of triggering events.

In general, at some point during processing of a telephone call, a central office switching system such as end office 12 will recognize an event in call processing as a 'Point in Call' which triggers a query to the ISCP 16. Ultimately, the ISCP 16 will return an instruction to the switching system 12 to continue call processing. This type of AIN call processing can utilize a variety of different types of triggers to cause the SSPs to initiate the query and response signaling procedures with the ISCP 16. In the presently preferred embodiments discussed below, the pre-paid calling service utilizes an off-hook delay (OHD) trigger.

The AIN data for the restricted line 13 will include the service logic or Customer Profile Record (CPR) record for the line in the customary fashion. The CPR (Customer Profile Record) record identifies the special restricted line application to which the line is subject. The restricted line system of the invention may allow free user choice of multiple PICs, such as, four PICs for international, inter-LATA, intra-LATA, and local. Those PICs are also included in the service logic for that line.

According to one preferred embodiment of the invention, the SCP or ISCP is capable of determining from the called number whether the call is a long distance call, an intra-LATA call, an international call, or a local call. That functionality for an SCP is described in detail in the assignee's pending applications in the name of Lipchock et al., U.S. patent application Ser. Nos. 08/753,150, 08/756,013 and 08/851,549. The parent application and its co-pending Continuation-in-Part applications, are incorporated by reference herein in their entirety. The parent application describes, and the continuation-in-part applications elaborate on, a system and method of customized routing in the interconnection of multiple public switched telecommunications networks in part controlled by operations of an SCP/ISCP.

Lipchock et al. U.S. patent application Ser. Nos. 08/756, 013 and 08/851,549 particularly describe in detail a system and method for differentiating and routing local calls in interconnected networks of a predominate local exchange carrier (LEC) having an advanced intelligent network (AIN), and a competing local exchange carrier (CLEC) having CLEC subscriber stations connected to switching systems in the LEC network. An originating trigger is set in the switching systems of the LEC network for CLEC subscriber stations. Activation of the trigger causes a message to the control point of the AIN and a determination of whether or not the call is local, the CLEC to which the station subscribes, and the routing directions for that CLEC. A response message from the control point to the switching system causes the switching system to route the call in accord with the instructions contained therein. The system routes non-local calls based on primary interexchange carrier (PIC) functionality in the switching systems. The determinations made by the control point require the accessing of databases. One of the databases is associated with the AIN control point and the other is separate. The other database may be combined with a database associated with a switch which is provided for routing service calls to LEC or CLEC facilities. The system is adapted for integration with a system for routing service calls in interconnected LEC and CLEC networks.

According to one preferred embodiment of the instant invention an off hook delay (OHD) trigger is provided in the profile in the respective end office (EO) 12, for each toll restricted subscriber's line. Toll restricted here is used to refer to lines which are toll restricted based on inability to pay, usually, if not always, based on past payment record. Thus toll restricted subscriber sinifies a subscriber with a past record of delinquent payment on toll calls. As a result, any number which these subscribers dial will trigger the off hook delay. The digits entered by the user are collected, and the end office switch, which has signal switching point (SSP) capability, sends a query message to the service control point (or ISCP) via the AIN data links and at least one service switching point or STP.

Specifically, the SSP capable end office (EO) 12 creates a TCAP query message containing relevant information, such as the telephone number assigned to the off-hook line, and transmits that query over an SS7 link to an STP. The query includes a destination point code and/or a global title translation addressing the message to the ISCP 16, and in response, the STP relays the query message over the appropriate link to the ISCP 16. The query from the end office 12 identifies the telephone number associated with the calling party's line and identifies the event that triggered the query, in this case the OHD. In this situation, the query also includes the collected digits, for the destination number dialed by the caller.

Upon receipt of the query, the service control point retrieves the service logic for this individual end user. In this case the OHD trigger type and calling party number point to a service logic application, here an application for limiting toll service for this subscriber. Specifically, the SCP recognizes the OHD trigger and uses the calling party number information as a key to retrieve the appropriate CPR from the internal databse. The end user logic in the CPR shows that the end user's terminal or subscriber line has the restriction application applied. Other services to which the calling terminal subscribes will also be shown, including the call sorting customized routing capability of the service control point. The service control point now looks at the collected dialed numbers and, using the customized call sorting and routing databases and associated processing, determines whether the call is a local call, a long distance inter-LATA call, an intra-LATA short distance call, or an international call.

The off hook delay trigger is defined by the requirements and specifications for off hook delay. As a result the switch or SSP sends a query message up to the service control point and includes in that query message the line PIC (Preferred Interexchange Carrier). However, this does not tell the service control point anything in this particular procedure. The requirements for the off hook delay were built before PIC one and PIC two functionalities were adopted. As a result the PIC is present but unusable in this preferred AIN application of the invention.

The AIN and service control point now determine that the calling party has the call restriction application applied, and has the call sorting on the basis of the dialed number application. Pursuant to the latter application the service control point looks at the dialed digits of the dialed number and ascertains the nature of the call as local, inter-LATA, intra-LATA, or international. If the call is local, the SCP instructs the switch or SSP to route the call in the normal fashion. The call does not involve toll charges.

However, if the call is a long distance inter-LATA toll charge or intra-LATA call, it is handled pursuant to the logic for long distance calls. Thus the call is determined to be long distance, and the customer's profile or service logic in the CPR retrieved from the service control point database controls call routing. This provides information as to the identity of the long distance or inter-LATA Interexchange Carrier, and the calling card service provider for the calling line. As previously stated, the calling card system and the inter LATA Interexchange Carrier (IXC) network may be commonly owned or operated. The service control point in ISCP 16 retrieves from its database a routing number for the prepaid calling card system identified in the service logic of the calling party. This is the prepaid calling card system with which the calling party is registered. With the routing number it is possible to route to that system.

The calling card system may be an existing system that is in place for existing cash or prepaid calling cards, such as the Seven-Eleven calling cards now in use or other existing calling card systems. The routing number may have an 800 number to access. In that situation one option would be simply to route the call using that 800 number. If that alone was done, the caller would receive from the calling card system some type of prompt for a PIN or authorization code. If the codes provided by the caller are validated, the caller must redial the original dialed number. This routine fails to provide the customer with the same ease of access as is provided to non-toll limited access customers.

In order to correct this deficiency, one preferred embodiment of the invention provides that the call set-up SS7 signaling which is used to route to the chosen prepaid calling card system, have one of several available parameter fields populated with the original dialed number. Stated differently, the parameter is set equal to the original dialed number, which is available. The CPR provides a routing number for accessing the PIC of the calling subscriber, for toll service. This could be the 800 number or any number that is used to route the call to the preferred prepaid calling card system chosen by the subscriber. When the 800 number is used it becomes the local routing number. It is used by the network to route the call to the right switch, which in this case is a prepaid call card system.

More specifically, the ISCP 16 formulates a TCAP call control type response message containing instructions for routing the call. This TCAP response message includes a calling party number field, a routing number field and several other fields, one of which is used to carry the dialed number. In accord with the invention, the routing number field now contains the 800 number or other number needed to access the toll restriction application on the selected CCS system 18. If the calling card system provides other services, such as normal calling card services, then there is more than one number associated with the CCS system 18. The CPR provides the number associated with the inventive toll restricted service as the routing number, rather than a general number for the system 18 or a number specifically associated with one of the other services available from the system 18.

The customer's CPR causes the ISCP 16 to populate another field in the response message with the ten-digit dialed number. Several parameter fields in the response message are available to carry the originally dialed number. Presently the preferred embodiment uses the "Generic Address Parameter" (GAP) field to carry the dialed number.

In response to the message from the ISCP 16, the switching system in the end office 12 initiates its normal procedures for routing the call, albeit using the routing number received from the ISCP 16. In this case, the end office 12 uses the number for the CCS system 18. To the end office 12, the CCS system 18 appears like a distant switch, therefore the end office 12 uses the routing number to initiate a CCIS communication with the CCS 18.

The end office 12 generates an Initial Address Message (IAM) for transmission to the CCS sysstem 18. The IAM message contains the routing number for the restricted toll call service in the destination number field, and contains the caller's normal telephone number or billing number in the calling party number field. As instructed by the ISCP 16, the end office 12 places the actual dialed digits from the GAP field of the response message in an appropriate field of the IAM message. This number may go in the "redirection number" field or the "original called number field," but preferably, the system uses the GAP field of the IAM message to carry the dialed number. The end office 12 transmits the IAM message over data links and through one or more STPs of the signaling network to the CCS system 18. In response to the IAM message, the CCS system sends back standard signaling messages, to enable the end office 12 to complete the call through the network to the CCS system 18.

The GAP parameter therefore tells the calling card system (CCS) 18 what number the caller originally dialed. The caller did not originally dial the 800 number, but dialed the number of the party being called. When the 800 number call is normally made it sends a charge or billing number of the originating station. The calling card system will get, because of the 800 call, the charge number of the person that called and the number originally dialed. That can be used to verify what account to debit to the calling card system. AIN can also force that to happen when the 800 number is not the routing number that is used. In that case AIN forces the charge number to be sent on the SS7 call set up message to the calling card system switch.

The CCS system 18 recognizes the particular routing number as one identified for an application pertaining to the restricted toll call service. Running this application, the CCS system uses the calling party telephone number as the account identifier. The system 18 executes a fairly standard routine for pre-paid calling services, but without the need for any more input information from the caller.

While the end user is a subscriber of the Local Exchange Carrier which operates the LEC network that makes the connection to the calling card system, it is the calling card system that totals the toll charges and looks to the subscriber for payment for its services. The local exchange carrier looks to the calling card company and/or the Interexchange Carrier or IXC and/or the end user for payment. The obligation of the end user to the local exchange carrier is usually satisfied by payment of its monthly charge for local service, which may include a charge for the toll limitation service.

Figure 4:
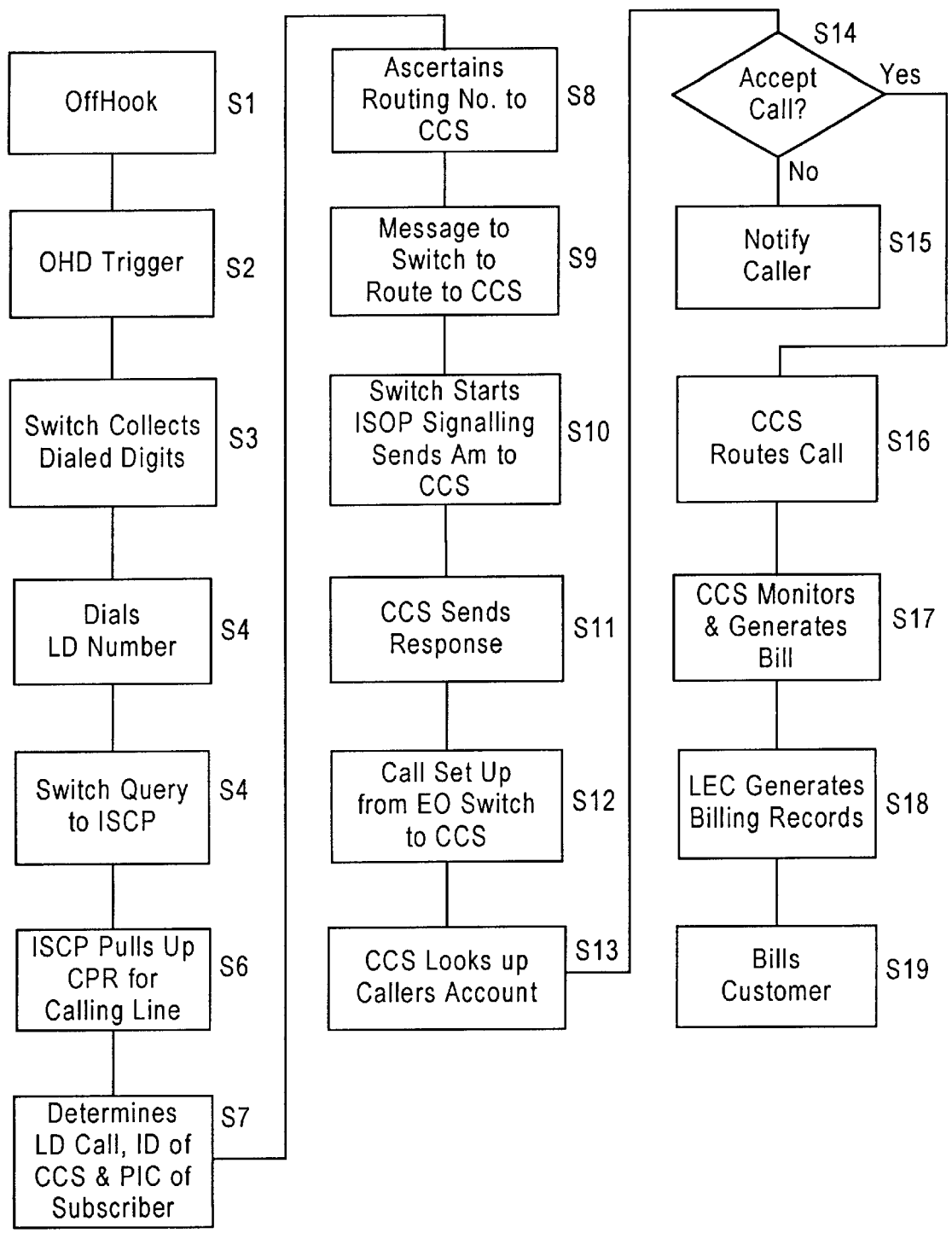
FIG. 4 is a more detailed flow chart depicting the operation of the invention according to one preferred embodiment.

Referring to the flow diagram shown in FIG. 4, the operation of this preferred embodiment of the system and method of the invention is now described for a long distance inter-LATA call by a toll restricted end user.

In the first step at S1 a person at the calling station 14 takes the telephone off of the hook.

Because the telephone goes off hook, the off hook delay trigger is hit in the end office 12, and the office suspends is processing of the call at S2. Other originating triggers could be used, such as the 1+ trigger.

The user dials the long distance number, typically a 1+ and all of the digits that have to be dialed. This is shown at S3.

At S4, the switch in the end office 12 collects the dialed digits. The switch then formulates and sends a TCAP (Transactional Capabilities Application Part) type query through an STP to the service control point or ISCP. This is shown at S5.

At S6, responsive to receipt of the query message, the service control point or ISCP retrieves the CPR or customer profile record of the originating or calling line. This is the logic that applies to this toll restricted line.

The query message includes the calling party telephone number and the dialed digits of the destination number. With this information the service control point determines that the user has dialed a long distance call. Using the service logic of the CPR, the control point determines that the caller has selected a specific calling card system, and the identity of the calling card system. The CPR also identifies the Preferred or primary Interexchange Carrier (PIC) chosen by the caller. In this example the Interexchange Carrier chosen by the caller is assumed to own or operate the chosen calling card system. This is shown at S7.

At step S8 the service control point also ascertains from the CPR or service logic the number (routing number) which it takes to route that call to the calling card system, which was identified in S7. This could be an 800 number or any actual telephone number.

At S9 the service control point sends back through the signal transfer point or STP a response message to the switch in the end office. The response tells the switch to route to that number for the calling card company. The response message includes the original dialed digits in the GAP field and serves as an instruction to the end office 12 to populate the GAP field in further signaling with the original dialed digits. The originating switch, insofar as it is concerned, thinks it is just routing the call to or through another switch using the CCS access number from the response message. The call may need to go through a switch, and that switch may turn it into ISDN (Integrated Services Digital Network); or the calling card system equipment may look like and have the capabilities of an end office switch itself.

The end office 12 now resumes is processing and routing of the call. As an initial step in that routing, the originating end office switch 12 now commences SS7 call set-up signaling. It begins sending ISUP (Integral Services Digital Network (ISDN) User Part) signaling to the calling card system equipment. The originating switch 12 sends an IAM (Initial Address Message) query message through one or more STPs of the interoffice signaling network to the switch at the calling card company or system. The IAM will include in a called number field the number which the service control point provided, which identifies the CCS and effectively identifies the restricted call application on that CCS. The message will also include a calling number field, which is really an end user identification for an account. It might be the actual number of the caller or it may be the billing number. The IAM will also include the GAP parameter, and as discussed above this field now contains the actual number that the user dialed. This is shown at S10.

At step S11 the calling card system switch responds affirmatively to the ISUP signaling, and at step S12 the call is set up from the originating switch 12 all the way to the calling card system 18. In the view of the originating switch, the call is now a completed call, and the originating switch has finished.

The calling card system 18 preferably runs an application corresponding to the routing number that it received in the IAM message. In this case, the application corresponds to the restricted toll call service, rather than to some prior service such as a pre-paid calling card service. At S13 the calling card system equipment has the call, it has the billing number, it has the digits which were originally dialed, and it knows that the caller has a poor long distance toll payment record and is subject to the restricted toll call application. As a consequence, the calling card system retrieves from its database the records of the account, and determines the toll balance.

At S14 the calling card system 18 makes a decision as to whether it will accept or reject the call. For example, the CCS system may decide to accept or reject the call based on whether or not the toll balance exceeds a threshold, such as the amount for completion of three minutes of a call to the dialed destination.

If the system decides to reject the call, if the balance is too low for example, at S15 it sends a pre-recorded message to the caller advising of that determination.

If the CCS system 18 decides to accept the call, the call routes it through the Interexchange Carrier network to its dialed destination This occurs at S16.

At this point the RATER in the calling card system 18 commences timing, monitoring and rating for the call. If, during the continuance of the call, the accrued charge for continuing the call equals or exceeds the remaining credit to the caller, the call will be terminated and a message sent advising the user of that fact. If the call is completed, it is rated and billing data is accumulated, recorded, and billed. This is a bill from the calling card system proprietor, which, in this case is an Interexchange Carrier which owns the calling card system. Typically, the system 18 deducts this latest billed amount from the subscriber's account balance. This occurs at S17.

In addition to this billing, the Local Exchange Carrier or LEC may create unique billing records for this new type of toll restricted call service. This occurs at S18. The logic that directed that the LEC initiate the service by sending the call to the calling card system, may also direct that the originating end office switch 12 generate these new type of billing records.

The existing Local Exchange Carrier debit and billing system obtains a record for every call and this may be sent to the calling card system. It is possible in the Local Exchange Carrier network to identify the calling card system and the duration of the call. This is accomplished through the LEC network AMA (Automatic Message Accounting) SLIP ID (Service Logic Profile Identifier). The SLIP ID identifies the calling card system and call duration. Thus data is created that records that the call went to a specified calling card system and lasted a specified period of time. These records may be used to generate a bill in the normal fashion from the LEC to the proprietor of the calling card company, which may constitute an Interexchange Carrier or IXC. This is for the service to the calling card system, including the provision of access. The billing may be directed to any consenting entity indicated by contractual arrangements between the Local Exchange Carrier and the end user, and between the Local Exchange Carrier and the calling card system proprietor, and between the Local Exchange Carrier and Interexchange Carrier. This may be any entity which the calling card system or its proprietor designates. In the case of a restricted toll call system, the designated entity may be a welfare department or the state. If the designee is an Interexchange Carrier the charge may be included in the charge for access.

In the foregoing example the method and operation of this embodiment of the invention is described in terms of a long distance or inter-LATA call. The operation is the same for an intra-LATA call. In this case a different calling card system would normally serve the function of the calling card system, although the functionality of the two systems could be combined in one system. As in the long distance example the user would have one or more PIC options and could name the preferred calling card system and the preferred local exchange carrier.

While the foregoing example shows an off-hook delay trigger, alternate originating triggers could be used. One example of such a trigger is a 1+ prefix trigger.

In addition to the above described preferred embodiment of the invention, the invention also comprehends less preferred embodiments that lack certain of the advantages provided in the most preferred embodiment. Thus it is possible to carry out a call restriction process by PIC-ing to the calling card system, using the switching functionality of the offices of the LEC network 10. That is, instead of PIC-ing to the POP (Point of Presence) of an Interexchange Carrier as for normal LEC/IXC subscribers, the restricted call customer is PIC-ed to a pre-paid calling card system, which appears to be the POP of the calling card system which provides prepaid toll calling card service. This may be accomplished using the PIC functionality in the switch and the conventional PIC-ing process. The called and calling numbers are now sent to the calling card system pursuant to normal Common Channel Interoffice Signaling procedures for toll calls. It is unnecessary to utilize the GAP parameter to pass along the digits of the dialed or called number.

While this embodiment of the invention possesses the advantage of simplicity, it sacrifices the flexibility which is found in the most preferred embodiment illustrated in the flow diagram shown in FIG. 4. For example, this embodiment cannot provide two, three, and four PIC. Also, the calling card system must use the calling party number to recognize that the caller has restricted toll service, to bypass any prompt and identification procedure used for normal calling card services.

Another embodiment may use an originating trigger so that when the financially impaired user goes off-hook he or she is immediately identified by AIN signaling as a toll restricted caller making a toll call by virtue of subsidization by some type of welfare system that allows the call. The end office switch is sent the translation code of the calling card system or company and the caller is immediately sent to that destination.

While the foregoing has described what are considered to be preferred embodiments of the invention, it is to be understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method for providing a restricted value telephone toll service through a telephone network serving a plurality of subscriber lines, comprising:

identifying in profile logic in the network, for a subscriber line designated for receiving the toll limited service, a subscriber's selection of one of a plurality of providers of toll-restricted service;

receiving a toll call made from said designated subscriber line by dialing from that line only a number for a toll call to a called line;

selecting one calling card type system from among a plurality of calling card type systems coupled to the network corresponding to the subscriber's selected service provider;

routing the toll call from said designated subscriber line to the one selected calling card type system; and supplying necessary information, comprising the number for the toll call and an identification associated with the designated subscriber line, to the one selected calling card type system to facilitate prepaid toll call account processing without further input from the caller.

2. A method as in claim 1, wherein:

the one selected calling card type system uses said necessary information to process said toll call to complete a connection from the designated subscriber line to the called line; and the one selected calling card type system limits the duration of said toll call in accord with credit on account for the designated subscriber line.

3. A method as in claim 1, wherein the supplying step sends said necessary information via common channel signaling to the one selected calling card type system.

4. A method as in claim 3, wherein the number dialed is transmitted via a Generic Address Parameter (GAP) field of a common channel signaling message.

5. A method as in claim 4, wherein, said Generic Address Parameter field is transported in Integrated Services Digital Network signaling to the selected calling card type system.

6. A method as in claim 5, wherein said Integrated Services Digital Network signaling comprises an Initial Address Message.

7. A method as in claim 1, further including the step of routing said toll call from said one selected calling card type system to a network of a subscriber selected Preferred Interexchange Carrier.

8. A method as in claim 7, wherein said toll call is routed to said one selected calling card type system by PIC functionality of a central office switch of the network.

9. A method as in claim 8, wherein said PIC functionality causes the central office switch to supply said necessary information to said one selected calling card type system in order to facilitate account processing without further input from the caller.

10. A method as in claim 1, wherein said toll call is routed to said one selected calling card type system based on control information obtained from a service control point of the network via common channel signaling.

11. A method as in claim 10, wherein:

said one selected calling card type system receives calls using a different routing number for a different billing service;

said one selected calling card type system selectively executes an application for the restricted value telephone toll service in response to the toll call routed using the routing number; and said one selected calling card type system selectively executes a different billing application in response to any call routed using the different routing number.

12. A method as in claim 10, wherein the control information obtained from the service control point causes the network to route the toll call to the one selected calling card type system using a first predetermined number assigned to the restricted value telephone toll service as a routing number.

13. A method for providing a service through a telephone network serving a plurality of subscriber lines comprising:

identifying in profile logic in the network a subscriber line designated for receiving a toll limited service;

receiving a toll call made from said designated subscriber line by dialing from that line only a number for a toll call to a called line;

routing the toll call from said designated subscriber line to one calling card type system, wherein the routing of the toll call utilizes PIC functionality of a central office switch of the network to select the one calling card type system from among a plurality of calling card type systems based on a pre-selection by the subscriber;

supplying necessary information, comprising the number for the toll call and an identification associated with the designated subscriber line, to the one selected calling card type system to facilitate prepaid toll call account processing without further input from the caller;

receiving a non-toll call made from said designated subscriber line; and routing the non-toll call through the network without routing to the calling card type system.

14. A method for providing a service through a telephone network serving a plurality of subscriber lines, comprising:

identifying in profile logic in the network a subscriber line designated for receiving a toll limited service;

receiving a toll call made from said designated subscriber line by dialing from that line only a number for a toll call to a called line;

routing the toll call from said designated subscriber line to the a calling card type system;

supplying necessary information, comprising the number for the toll call and an identification associated with the designated subscriber line, to the one selected calling card type system to facilitate prepaid toll call account processing without further input from the caller;

receiving a non-toll call made from said designated subscriber line; and routing the non-toll call through the network without routing to the calling card type system, wherein the step of routing the toll call comprises:

(a) accessing a call processing record stored in a services control point of the network to select the calling card type system from among a plurality of calling card type systems based on a pre-selection by the subscriber; and (b) based on information from the call processing record, causing a central office switch of the network to route the toll call to the selected calling card type system.

15. A method as in claim 14, wherein the step of routing the non-toll call comprises:

accessing the call processing record to recognize that processing of the non-toll call does not require routing to a calling card type system; and based on information from the call processing record, causing a central office switch of the network to route the non-toll call in accord with a caller dialed destination number of the non-toll call.

* * * * *